Figure 10:
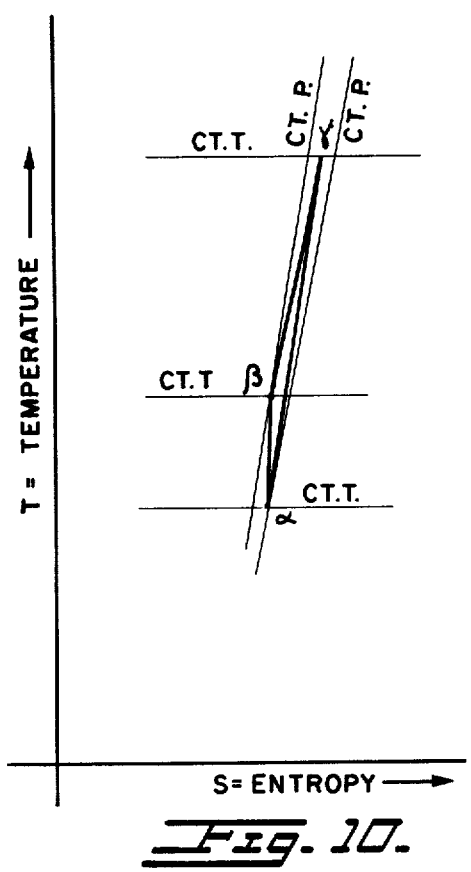
Figure 11:
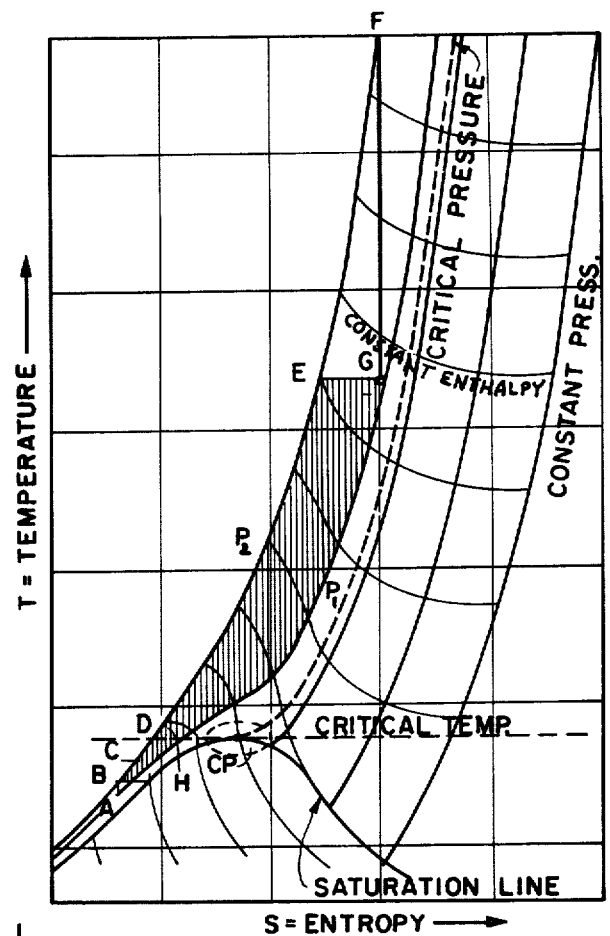

United States Patent [19]
Baciu

[11] 3,875,749

[45] Apr. 8, 1975

[54] GEOTHERMAL POWER PLANT WITH HIGH EFFICIENCY

[76] Inventor: Petru Baciu, 45-20 48th St., New York, N.Y. 11377

[22] Filed: Apr. 18, 1974

[21] Appl. No.: 461,913

Related U.S. Application Data

[63] Continuation-in-part of Ser. Nos. 307,589, Nov. 17, 1972, abandoned, and Ser. No. 435,697, Jan. 23, 1974.

[52] U.S. Cl................................. 60/641; 165/45
[51] Int. Cl.......................... F01k 25/10; F03g 7/00
[58] Field of Search........................ 165/45; 60/641

[56] References Cited
UNITED STATES PATENTS

| | | | |
|---|---|---|---|
| 2,461,449 | 2/1949 | Smith et al.................... | 60/641 X |
| 3,470,943 | 10/1969 | Van Huisen................... | 165/45 |

*Primary Examiner*—Martin P. Schwadron
*Assistant Examiner*—Allen M. Ostrager

[57] ABSTRACT

In a preferred embodiment, there is provided a closed-system geothermal power plant operative and maintained at super-critical pressure in the utilization of carbon dioxide as the power fluid used in the cycle for the driving of a super-critical pressure-type gas turbine(s) and associated generator(s) to electricity, from which exhaust effluent still in a gaseous state but at reduced pressure nevertheless still at super-critical pressure and temperature is passed through a heat-exchanger(s) and thereafter passed to a super-critical-type condenser(s) in which the gaseous carbon dioxide effluent is condensed to a liquid state by a fluid with a lower temperature and from which condenser(s) the liquid carbon dioxide still at super-critical pressure is fed to a pump(s) which increases the pressure on the liquid carbon dioxide effluent from the condenser(s) and is directed to heat recuperator(s) and to the heat exchanger(s) in segregated heat-exchanger relationship with the turbine(s) effluent gas, resulting in further elevating the temperature of the high-pressure super-critical fluid carbon dioxide, and from the heat-exchanger carbon dioxide is passed downwardly through down-flow conduit(s) extending downwardly through a well space heat exchanger including a heavy insulating liquid, the downwardly extending conduit(s) extending into a subterranean cavity within preferably basalt rock within which cavity the gas carbon dioxide at the super-critical temperature and pressure in a gas state absorbs sufficient heat energy to increased carbon dioxide parameters to higher super-critical parameters of carbon dioxide having both elevated super-critical temperature and elevated super-critical pressure, which thereafter is channeled upwardly through up-flow conduits of a type to withstand elevated super-critical temperatures and pressures, the up-flow conduit(s) passing upwardly through the well space and again to the turbine inlet. The basalt cavity includes upper and lower chambers spaced apart from one-another by two preheater chambers which communication with the upper chamber(s) with a pressurized water heat-exchanger medium flowing cyclically between the upper, preheater and lower chambers, upwardly through an upper well of the lower chamber(s) extending from an upper part of the lower chamber(s) to an upper portion of the upper chamber(s), and flowing from a lower portion of the upper chamber(s) through the preheater chambers downwardly through well(s) to the lower chamber(s), there being preferably a plurality of such down-flow wells from the preheater chamber(s) to the lower chamber(s). These wells are preferably in close juxtaposition and contact with the lower chamber(s) side walls for heat exchange flow of geothermal heat into the channeled water, the pressurized water being flowed through the upper chamber in a state of isolated heat-exchanger relationship with the fluid carbon dioxide flowing through the upper chamber(s), the carbon dioxide in the upper chamber(s) preferably flowing through a plurality of parallel-flow serpentine conduits to the upper chamber(s) carbon dioxide gas outlet, preferably the well being isolated from the upper chamber(s) by a pressure-resistant barrier wall with appropriate conventional pressure-relief emergency valves.

Further enhancing the present invention is a novel condensation and sub-cooling system, equipped with the condenser, two heat recuperators, an electric motor, a turbo-compressor, a turbine and conduits, which permits recovery of heat eliminated from the power cycle fluid during its process of condensation and sub-cooling and insures the compression of fluid after this to high super-critical pressure. After the system accomplished condensation and sub-cooling of the power cycle fluid, it returns totally the absorbed heat to the power cycle fluid without any losses of significance. By the harnessing of energy there is prevention of atmospheric thermal pollution.

9 Claims, 13 Drawing Figures

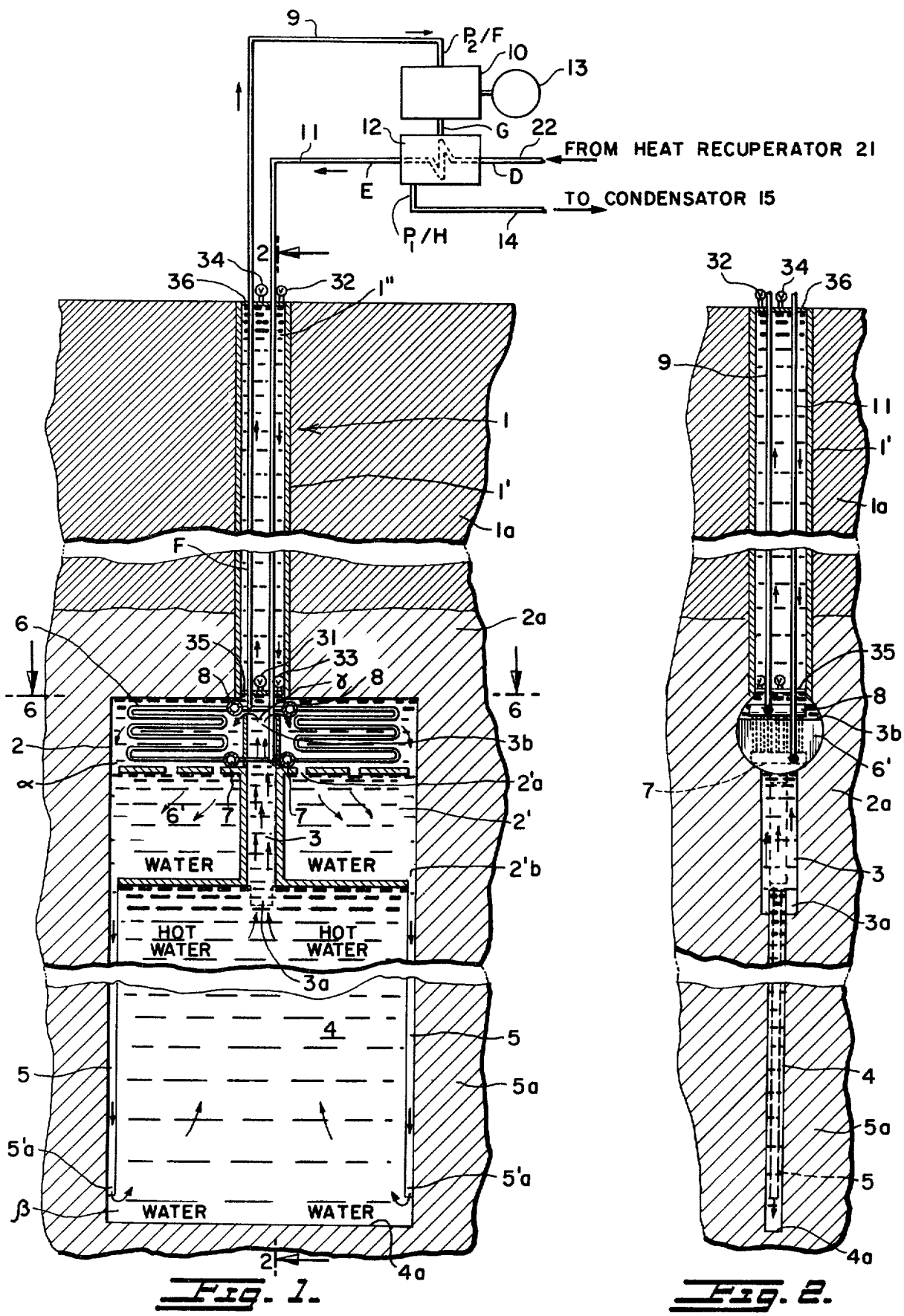

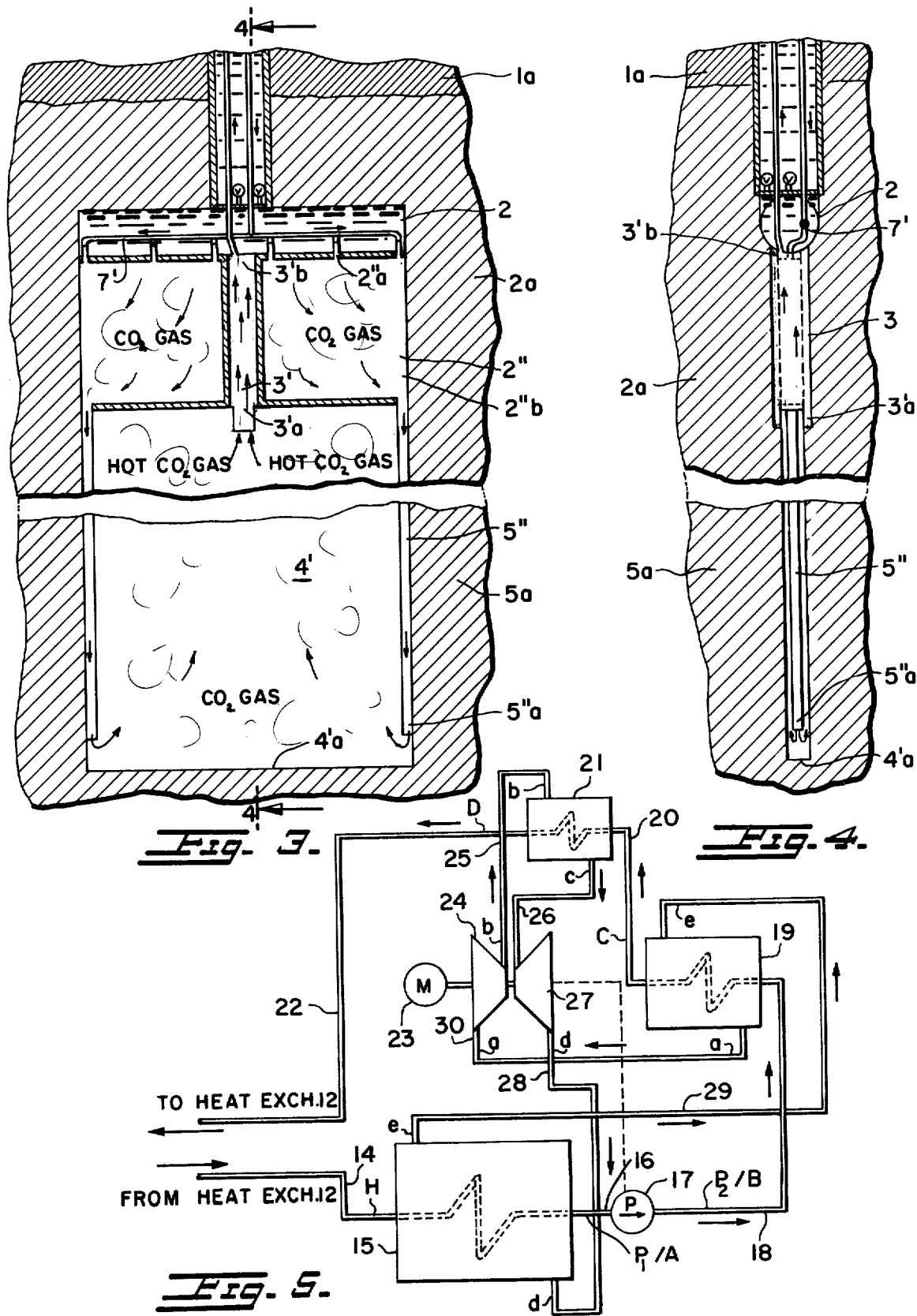

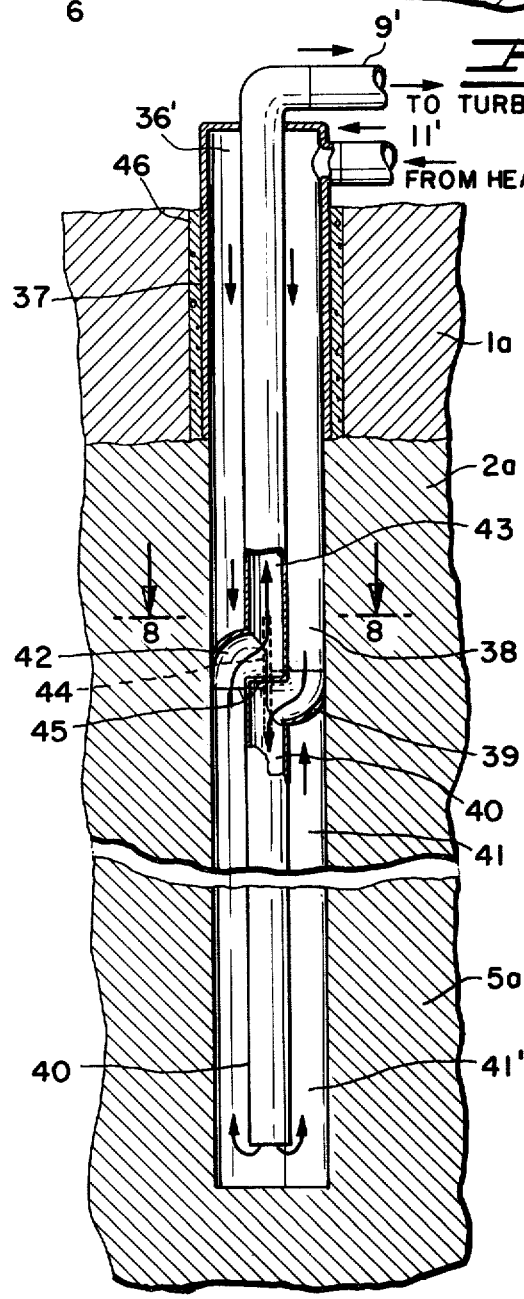

GEOTHERMAL POWER PLANT WITH HIGH EFFICIENCY

This invention relates to an improved super-critical carbon dioxide closed system heat-capturing electricity-generation plant. The present patent application is a continuation-in-part of the patent applications: (1) GEOTHERMAL SUPER CRITICAL POWER . . . , filed Nov. 17, 1972, U.S. Ser. No. 307,589, now abandoned, and (2) DIAMOND DRILL AND ROCK FRAGMENT EXCAVATION DEVICE, filed Jan. 23, 1974 U.S. Ser. No. 435,697.

BACKGROUND TO THE INVENTION

Prior to the present invention, the present inventor has made major advances in the art in the harnessing and utilization of heat energy from geothermal sources as set forth in each of the parent patent applications noted above, the entire disclosure of each of the above-noted parent applications being hereby incorporated by reference hereinto as a part of the present invention's disclosure. In the patent application U.S. Ser. No. 307,589 it was disclosed that there are major advantages and efficiencies of operation obtained by the total operation of a carbon dioxide system which has super-critical pressure in the obtaining of heat by a closed system of heat exchange from subterranean levels within the lithosphere for the conversion to electrical energy by utilization of super-critical-type high-pressure turbine(s). Also in the application Ser. No. 435,697 directed to the excavation of subterranean areas for the forming of cavern(s) therein where the rock is of sufficient hardness as to withstand the compressive pressure of surrounding earth without any significant degree of reinforcement or bracing, such as is the case in naturally or artificially formed caverns in basalt rock which is a hardened volcanic plug-type rock.

SUMMARY OF THE INVENTION

It is an object of the present invention to make use of such deeply located caverns, either natural or artificially excavated, with special heat exchange low maintenance, together with an improved combination resulting in higher level of energy being made available to the gas turbine of a super-critical-pressure type.

Another object is to reduce the cost of building such a system.

Another object is to reduce minumum hazards to operators in the operation and maintenance of the geothermal system.

Another object is to obtain heretofore unobtainable high levels of energy of a caloric nature, with regard to the rate of energy conversion.

Another object is to further enhance the heat energy absorption capacity of a super-critical carbon dioxide system.

Other objects become apparent from the preceding and following disclosure.

One or more objects of the present invention are obtained by the invention as defined herein.

Another object is to obtain a power plant achieving substantially total recovery of eliminated heat for condensation and sub-cooling process.

Another object is to obtain a power plant which uses well known working fluids.

Another object is to obtain a power plant which employs very simple equipment underground without any kind of rotary machine and with big efficiency of primary cycle which is working underground.

Another object is to obtain a power plant which is able to work using powerful geothermal sources which sources are relatively shallow.

Another object is to obtain a power plant which does not pollute the lithosphere, hydrosphere or atmosphere.

Another object is to obtain a power plant which does not use water for cooling to thereby permit the building of the power plant where there is a geothermal source whether or not water is available from the surrounding local environment.

Broadly the invention may be defined as a geothermal super-critical pressure carbon dioxide closed system preferably with total recovery of heat-of-condensation lost during the condensation and sub-cooling phase of the power plant obviously employing equipment which will withstand super-critical pressures in the nature of gas turbines, heat exchanger(s), condenser(s), pump(s), heat-recuperator(s), interconnecting conduits, and the like. The highly pressurized super-critical pressurized carbon dioxide fluid is preferably fed to a heat exchanger in heat exchange relationship with but isolated from carbon dioxide gas effluent from the gas turbine. Thereafter the superheated carbon dioxide super-critical pressurized superheated gas is fed downwardly through sedimentary layers of rock(s) to subterranean lithosphere and preferably to within basalt volcanic rock plug cavern space either naturally or artificially-excavation ocurring. The basalt rock cavern space is subdivided into upper chamber(s) and lower space-apart chamber(s) segregated from one-another by two intermediate preheater chambers which are in communication with upper chamber and the wells extending from the lower portion of preheated chambers to a lower portion of the lower chamber, the plurality preferably extending in juxaposition — i.e., in contacting relationship to, the basalt cavern side upright walls in direct heat-exchange relationship therewith for the heating geothermally of the downwardly flowing heat exchange medium, and the up-flow well(s) extending from an upper portion of the lower chamber to an upper portion of the upper chamber, the lower chamber up-flow outlet well preferably being located about centrally of the lower chamber. Thus there is means for free flow of the upper and lower chambers' heat exchange medium cyclically preferably to and from in a preferred embodiment, and in this preferred embodiment the carbon dioxide inlet to the upper chamber and the carbon dioxide upper chamber outlet being connected to preferably serpentine-like heat-exchange pluralities of parallel-flow conduits extending serpentinely to and fro through the upper chamber space in heat exchange relationship with the upper preheater and lower chambers' separate and isolated heat exchanger medium such as pressurized water, or alternately high boiling medium. In a less preferred embodiment, however, the carbon dioxide fluid may be channeled directed from an inlet to the upper chamber from the well space, to the upper chamber, preheater chambers down-flow outlet well, channeling flow upwardly from the lower chamber, to the upper chamber outlet conduit extending upwardly through the well space, with the upper chamber containing a heat conducting and/or insulating liquid medium of any conventional or desirable type, preferably of a liquid high molecular weight organic nature. Alternately there may be another preferred arrangement of concentric conduits in center-flow relationship described below in detail. Another preferred feature of the present invention is the employment of a preferred cryogenic condenser system.

There exists a heat-energy potential within the hard and hot rocks of the earth's crust of an enormous magnitude previously available by applying modern technology. Efficient utilization of these sources of energy has constituted one of the major problems within the field of energy technology. The hard and hot rocks of a basalt type, formed by volcanic lava in so called volcania plugs, are of particular great importance due to the highly desirable heat-energy characteristic properties which satisfy the needs of a good thermal energy cycle.

There are well known hard and hot rocks typically of the basalt type, which have temperatures of up to 1,200° Fahrenheit or higher, together with a rate of flow of conductance of caloric heat of three up to about ten times higher than the rate of flow through rock typically know as the lithosphere. Volcanic lava has a very high density, which high density results in the high degree or high rate of thermal conductivity of the heat by lava rock between magna toward the earth's surface is a significantly higher rate than is found or possible in other geological formations. The basalt rocks formed in the hard monolithic block advantageously do not permit the deformation and/or collapse of chamber walls of caverns or other such spaces, naturally occuring or excavated, in contrast to sedimentary layer rock which requires for its caverns substantial reinforcement and bracing to avoid and/or off-set deformation and collapse of excavated or drilled spaces therein. An additional advantage of basalt rock is that it is substantially insoluble in water even at substantially high temperatures. These basalt desirable rock characteristics result in the possibility of finding the optimum solutions for the conversion of caloric energy into electrical energy as one of the greater or greatest potential sources of caloric energy available from geothermal sources for the planet earth. Accordingly, the present invention is directed to an improved geothermal power plant operative at super-critical pressure for the entire cycle, optimizing high efficiency and safety of operation and relatively simple plant construction and economical operation including the maintenance thereof devoid of expensive technical problems associated with the tapping of geothermal energy. The present system can function substantially automatically without pollution of the lithosphere, hydrosphere, or atmosphere.

The heat exchanger medium used in intermediate and lower chambers is in direct contact with the walls of these chambers. This means that the water is in direct contact with hot and hard rock without any intermediate material or without any covering of the chambers walls.

As an intergal part of the present invention, in a preferred combination thereof, there is provided a cryogenic condenser with a super-critical coolant system. The secondary cycle super-critical state discussed above is maintained for the carbon dioxide during the course of condensation and subcooling of the carbon dioxide from a gaseous state to a liquid state of reduced-volume and correspondingly reduced-temperature. Thereafter the condensed super-critical liquid is compressed to its former high pressure with a concurrent increase in its temperature by virtue of energy of compression by a pump. Then the pressurized super-critical carbon dioxide gas is passed through first recuperator, which flows the heated coolant from the condensor to heat exchange relationship with the pressurized super-critical carbon dioxide liquid.

Subsequently the air-coolant gas is compressed by a turbo-compressor with an incident energy-or-compression increase in temperature of the air-condenser coolant. The coolant then flows into a heat-exchange relationship in a second recuperator again with the pressurized super-critical carbon dioxide liquid which thereby further recuping the remaining portion of the heat eliminated during earlier condensation and sub-cooling. The further heated carbon dioxide super-critical fluid thereafter is directed to a heat exchanger in heat exchanger relationship with effluent from the super-critical-circuit turbine. The thereby cooled coolant (which is preferably air), after the further heating of the super-critical carbon dioxide fluid, flows to an energy-withdrawal means such as a turbine(s) resulting in a decrease in temperature and pressure of the air condenser coolant. Thereafter the air coolant is returned to the condenser for the beginning of a second cycle in the condensing and sub-cooling of the super-critical carbon dioxide fluid flowing to the cryogenic condenser. By this unique novel cryogenic system for the condensing and sub-cooling of the super-critical carbon dioxide gas, and/or by the subsequent pressurizing thereof in a liquid state, and for the subsequent reutilization for the heat extracted by recuping of the heat from the air coolant and later further recuping heat energy from the condenser(s) coolant in the manner noted above, there is achieved a salvaging of the heat of condensation eliminated from the condensed super-critical carbon dioxide fluid. The salvaged heat of condensation by this system is utilized for preheating the pump-pressurized super-critical carbon dioxide condensed liquid thereby also preventing the releasing of large quantities of heat-energy into surrounding environmental atmosphere. As a part of the cryogenic condenser and heat-recovery system, the coolant (by virtue of being a gaseous coolant) provides a high efficiency throughout its condensation and sub-cooling and heat-recovery cycle. After the last-occuring preheating of the super-critical carbon dioxide fluid by the turbine-conpressed condenser coolant, the condenser coolant is as noted above thereafter directed through preferably a turbine for further gaining of work energy from the coolant fluid prior to the return of the thereby low pressure and low temperature air coolant to the cryogenic condenser whereby lower temperature higher quantity of caloric energy in the nature of heat of condensation may be transferred thereto from the super-critical carbon dioxide being fed through the condenser.

The invention may be better understood by making reference to the Figures as follow.

THE FIGURES

FIG. 1 discloses an in-part view of a geothermal energy plant of the present invention, the preferred cryogenic condenser heat-recovery system not being illustrated in detail nor in its entirety in this particular view. The Figure shows a cross-sectional view through the various layers of the earth and through the geothermal well, and the cyclic flow path through consecutive upper intermediate, and lower chambers such that the mechanism of flow as viewed in side cross-sectional view may be understood for the respective heat-exchange fluids.

FIG. 2 illustrates a further view of the embodiment of FIG. 1 as taken typically along the lines 2—2 of FIG. 1.

FIG. 3 illustrates an in-part view in side cross-sectional view of alternate embodiment to that of FIG. 1 and FIG. 2, this embodiment of FIG. 3 differing principally in the fact that the FIG. 3 super-critical fluid (such as carbon dioxide) flows downwardly through the intermediate chambers from a plurality of inlets, downwardly from the intermediate chambers into the lower chamber. From the lower chamber the fluid flows by connection upwardly eventually into the central up-flow well leading through the upper chamber, for transport of the super heated super-critical gas to a super-critical high-pressure type turbine (not shown in this Figure but being the same as that disclosed in FIG. 1). In this particular embodiment of FIG. 3 the upper chamber serves as a static heat-insulation space filled preferably with liquid such as water or high-molecular weight organic matter.

FIG. 4 illustrates a side cross-sectional view of the embodiment of FIG. 3 as taken along the lines 4—4 thereof.

FIG. 5 illustrates a diagrammatic view of the completion of the cycle for the embodiment of either FIGS. 1 and 3 or 7, the FIG. 5 embodiment disclosing a cryogenic condensation and recuperator heat-system in which super critical carbon dioxide turbine effluent from and through the heater exchanger is condensed in a cryogenic condenser to a liquid state, then pressurized in the liquid super-critical state, thereafter reheated by recovery heat of condensation originally extracted by the subcooling and transfer cycle fluid.

FIG. 6 illustrates a view of the FIG. 1 and 2 embodiment as taken along lines 6—6 thereof.

FIG. 7 illustrates a still other alternate embodiment compared to those of each of FIGS. 1 and 2 and FIGS. 3 and 4, the FIG. 7 embodiment being illustrated in side cross-sectional vertical view and an in-part view of the plant, and being in effect a substitute for the embodiment of FIGS. 3 and 4. The embodiment of FIG. 7 illustrates the down-flow of the super-critical carbon dioxide fluid around an upward flow conduit to which the carbon dioxide super-critical gas is channeled upwardly with the exception of the upper outer flow channel becoming (at an intermediate point in its downward travel) the central conduit thereafter such that the gas flows from the base thereof into the surrounding outer channel. The heat form surrounding rock environment heats the gas which then flows upwardly by connection to the mid-point which thereafter becomes the central up flow channel insulated by the outer channel during the upper travel of the heated carbon dioxide (in its super-critical state) toward the turbine.

FIG. 8 illustrates a cross-sectional view of the embodiment of FIG. 7 as taken along lines 8—8 thereof.

In like manner, FIG. 9 illustrates a vertical view of the embodiment of FIG. 8 as taken along lines 9—9, to show a cross-sectional inside view of the horizontal cross-section of FIG. 8.

FIG. 10 through 13 respectively illustrate typical temperature and/or entropy diagram of the various fluids of the preceding embodiments, and are described in detail in the following detail description. In greater particularity, however, FIG. 10 is a temperature-entropy diagram for a primary cycle hereafter described for the liquid-state heat exchange medium of the FIG. 1 embodiment circulating between the upper, intermediate and lower chambers. In the FIG. 10 illustration, CT.T. represent constant temperature, and CT.P. represent constant pressure. The FIG. 11 diagram is a temperature-entropy diagram for the super-critical cycle fluid typically carbon dioxide.

Figure 12:
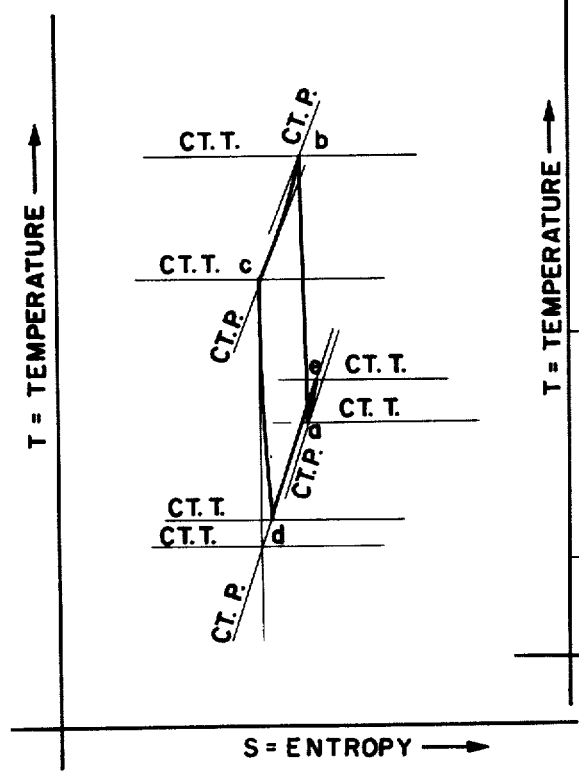
Figure 13:
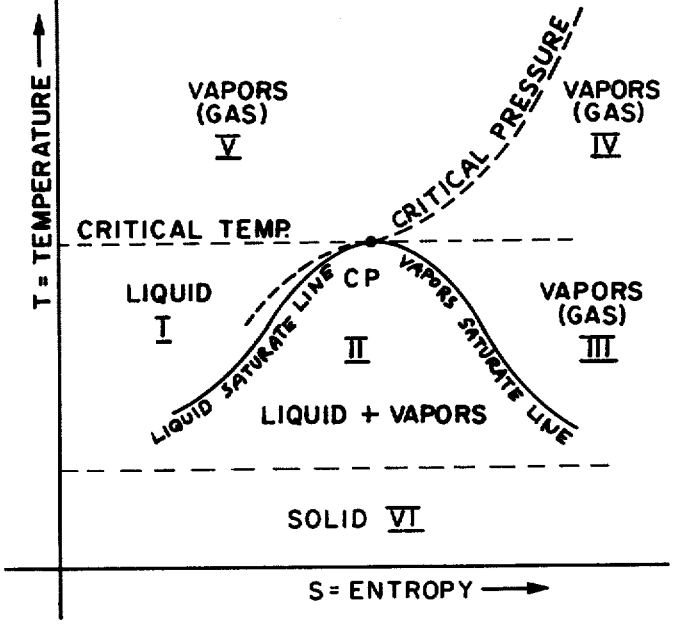

Circulated downwardly into the serpentine-like heat exchange conduits within the upper chamber and as the super-critical carbon dioxide gas circulating through the well up pipe to the super-critical high-pressure turbine and onwardly through the cycle as described previously above for FIG. 1, 2 and 5. FIG. 12 is a a temperature-entropy diagram for sub-cooling and transfer cycle. FIG. 13 illustrate alotropic fluid state in temperature entropy diagram.

DETAIL OF THE DESCRIPTION

FIG. 1 illustrates the various earth principal layers of sedimentary type rock $1a$, the deeper hard rock $2a$, and basalt hard and hot rock $5a$ and lower depths $4a$. In order to gain access to hard and hot rock, it is necessary to build the vertical shaft identified as well 1 and the horizontal tunnel 2 extending substantially horizontally laterally in each of opposite direction from the central well 1 at the base thereof, the tunnel 2 being built in the hard rock and adapts where the rock temperature allows the building of such a tunnel by conventional and/or known techniques and/or by the technique set forth in patent application.

From the tunnel, there is built the upright or vertical well 3 in side view, of extending substantially co-axially with the well 1, but extending downwardly toward the interior of the earth to the depth to which the temperature of the hard and hot rocks has this substantially higher value. The chamber 4 (which is the lower chamber of the FIG. 1 illustration) is built by excavation by either conventional methods and/or by method(s) set forth in Applicant's parent application on excavation of hot and hard rock by diamond, or the chamber 4 may alternately be a naturally occuring cavern in basalt rock formation of the type of caverns formed during the cooling process of lava.

At each of the opposite ends of the elongated tunnel tube, and along the bottom of the upper-chamber elongated tunnel, there are built down-flow channels outlet ports into the intermediate chambers. From the bases of the intermediate chambers, or wells 5 (of which preferably the vertical rock wall or the lower chambers constitutes a part of one or more wall of the vertical wells 5) extend to a location in juxtaposition to the bottom of chamber 4. Within the tunnel 2, extending in each opposite directions toward each of the opposite ends of the tunnel 2, there are provided heat exchange conduits or pipes preferably of serpentine configuration for serial flow therethrough, in the nature of those illustrated. The down-flow conduit 11 extends to a base of the chamber 2 and divides into direction flow in each of opposite directions toward main distribution conduits 7, preferably one for each end of the tunnel, with a plurality of the serpentine pipes and with parallel serpentine pipes eventually flowing into a common outlet conduit 8 from which flow is channeled into the up-conduit 9. Conduit 9 is eventually connected above the face of the earth preferably to the inlet of the turbine 10. The pipe 11 receives its carbon dioxide flow from the outlet of the heat-exchanger 12. Both the up-conduit 9 and the down-conduit 11 pass through the shaft well 1 having an insulation liquid such as water or heavy organic liquid designated 1'' in case within the wall 1'. The exit of the turbine 10 is connected within the heat-exchenger 12 such that the effluent from the turbine 10 flows in isolated exchange relationship with the carbon dioxide super-critical fluid entering into the heat exchanger through conduit 22 and exiting through conduit 11. The turbine 10 is also coupled with an electric generator operatively to drive the generator.

A heat-exchanger 12 is connected through its conduits 14 and 22 to the cryogenic condenser and recuperator system which constitutes a preferred embodiment of the present invention.

Extending upwardly from the lower chamber 4 through the intermediate chamber 2' from an upper portion of the chamber 4 to and through the base of the chamber 2' is a well 3, for the upward flow of hot water through the inlet 3a of the well 3 upwardly through the well 3 and into the chamber 2. At the top of the well 3, within the chamber 2, on each of opposite sides preferably substantially parallel walls extend across the chamber 2 with the result of continuing the flow from the conduit 3 upwardly to an upper part of the chamber 2. The walls extend toward but less than all the way to the upper ceiling portion of the chamber 2, thereby permitting hot water flowing upwardly through the conduit 3 to pass from between the walls at an exit point 3b into lateral directions toward each of opposite ends of the chamber 2, to thereby be circulated over and around the serpentine pipes 6 in heat exchange relationship therewith and to pass downwardly through the upper chambers, lower-wall apertures 2'a into the intermediate heat-insulating chamber 2' outwardly through its lateral exit 2'b and downwardly through the conduits 5.

Preferably there is a horizontal barrier isolating the space within the tunnel 2, such as the isolating barrier 35, thereby isolating the water or other heat-exchanger medium flowing within the well 1. Extending through the isolating barrier 35 preferably are two pressurized valves, one being a manual control valve 31 and the other being a safety valve 33.

The entrance to the shaft of well 1 from the earth's surface is also closed by the horizontal closure lid 36 also preferably having two valves namely the manual valve 32 and the safety valve 34. Water or other insulating fluid may be introduced through the valves 31 and 32. Instead of being manual, they may be automatically controlled.

Turbine effluent fluid from the turbine 10 is passed in its heat-exchange isolated relationship for the cooling thereof, through the heat-exchanger 12, and therefrom through the conduit 14 to the cryogenic condenser 15.

The turbine effluent, such as preferably carbon dioxide or other suitable fluid, becomes totally liquefied within the cryogenic condenser 15 prior to its exit by conduit 16. The carbon dioxide in its liquid state accordingly occupies considerably less volume and is much more easily pressurized to a high super-critical pressure than a gas could be, in passing from the conduit 16 pressurizing pump 17 into the conduit 18. The carbon dioxide liquid at super-critical pressure thereafter passes from the conduit 18 through the heat-recuperator 19 and thereafter passes by conduit 20 through the heat recuperator 21 to the conduit 22 to pass back to the heat exchanger 12 for the final preheating of the carbon dioxide prior to its passage downwardly through the down-pipe 11. The cycle thereafter is repeated, as previously noted above.

The particular equipment an apparatus associated with the above noted system is as follows: (1) a primary cycle, (2) a secondary or power cycle, and a tertiary sub-cooling and transfer cycle.

The primary cycle includes typically the hard and hot rock, water, chamber 4, well 3, the walls 6' continuing the well 3, the tunnel 2, the serpentine parallel pipes 6, the intermediate chambers 2', and the well conduits 5. This primary cycle performs in accordance with the temperature and entropy diagram of FIG. 10; where the cooler water from the bottom of the tunnel 2 passes downwardly to the bottom of the chamber 4 due to its greater density and due to the pull of gravity of the earth, there is a rise in the pressure and temperature of the coolant water from point alpha to point beta. The extent of the pressure will be in accordance with weight of the water column extending vertically between the bottom of the tunnel 2 and the bottom of the chamber 4. From the point beta to the point gamma, the water flow upwardly to the chamber 4, capturing the caloric energy directly from the hot and hard rock by heat conductance. At the same time, when the water is rising in ascending from the bottom of the chamber 4 to the upper portion of the tunnel 2 through the well 3 and between the walls 6', the pressure decreases proportionately with its level of elevation and with the density of hot water in the chamber 4. For the top of the chamber 4, the water flows through the well 3 and above the walls 6' to the up-side of the tunnel 2.

From the point gamma to the point alpha, the hot water exits into the upper portion of the tunnel 2, then flows downwardly between the serpentine pipes 6 where the water gives up caloric energy by heat exchange through the walls of the serpentine pipes: this is the caloric energy captured from the hot walls during its passage through the intermediate chambers 2', conduits 5 and through the chamber 4, given up to the super-critical carbon dioxide fluid within the serpentine pipes 6 thereby super-heating the super-critical carbon dioxide prior to the passing of the gaseous super-critical carbon dioxide upwardly through up-flow pipe 9.

The energy loss due to the friction of circulation of the water within the tunnel passage 2 and downwardly through the intermediate chambers 2' conduits or walls 5 through the chamber 4 and upwardly through the conduit 3 is negligible in quantity and accordingly may be ignored.

From the point alpha, the cycle is repeated.

The primary cycle described above works at sub-critical pressure of the employed working fluid such as water, as the pressure depends upon the technical characteristic of the hot and hard rock.

The above noted secondary cycle may be referred to as the power cycle and is brought about within equipment or apparatus as follows: The carbon dioxide as a preferred heat exchange medium, the serpentine type pipes 6, the channeling pipes or conduits 8 for receiving the gaseous super-critical carbon dioxide from the serpentive pipes, the up-flow conduit 9, the super-critical pressure type turbine 10, the super-critical structure heat-exchanger 12, the conduit 14 being therefrom, the condenser 15, the pump 17, the conduit 18, the heat-recuperator 19, the conduit 20, the additional heat recuperator 21, the conduit 22, the conduit 11 exiting from heat exchanger 12, and the distribution pipe 7 for distributing the liquid super-critical carbon dioxide to the serpentine pipe. The secondary cycle works in its entirety at super-critical pressure with regard to the entirely theoretically Raikin cycle with condensation taking place in the super-critical pressure — see the temperature-entropy diagrams of FIG. 11. The heat exchanger working medium utilizied in the secondary cycle discussed above preferably is carbon dioxide or other correspondingly suitable fluid such as air, nitrogen, or the like.

The secondary cycle discussed above functions as follows: The pump 17 receives liquid carbon dioxide as a result of the effluent carbon dioxide passing from the heat-exchanger 12 through the conduits 14 to and the cryogenic condenser 15 and through conduits 16. The pump raises the pressure from $P_1$ to $P_2$ and warms and thereby increases temperature of the carbon dioxide from point A to point B. Thereafter the carbon dioxide by virtue of the pump pressure is caused to flow through the conduit 18 into the heat-recuperator 19 where the carbon dioxide reacquires heat from the sub-cooling and transfer cycle fluid, this recovered heat being part of the heat-of-condensation eliminated during the condensation and sub-cooling of the turbine effluent (secondary cycle) carbon dioxide during its passage through cryogenic condenser 15. Due to this acquisition of heat-of-condensation, in the heat-recuperator 19 the super-critical carbon dioxide liquid in passing from its pipe 18 through the recuperator 19 to the conduit 20 increases in its temperature from point B to point C. The carbon dioxide liquid at super-critical pressure passes from conduit 20 through further heat recuperator 21, where it receives the remainer of heat eliminated during condensation, to the extent that eliminated heat was not returned by the recuperator 19.

Accordingly, in the passing of the fluid super-critical carbon dioxide through the recuperator 21, the temperature of the super-critical carbon dioxide is increased from point C to point D, changing the fluid from liquid to gaseous state. Thereafter the carbon dioxide flows through the conduit 22 to the heater-exchanger 12 at which point some of the residual heat in the turbine 10 effluent causes the super-critical carbon dioxide fluid flowing through heat exchanger 12 by the conduit 22 to be increased in its temperature from point D to point E at the exit of the heat exchanger 12 as it enters the conduit 11. From the heat-exchanger 12, the carbon dioxide super-critical fluid in its super-critical heat state flows through the conduit 11 downwardly to the substantially horizontal pipe 7 extending across the chamber 2, through which pipe 7 the super-critical carbon dioxide is passed from the pipe 7 into the parallel serpentine shaped pipes 6 through which the fluid absorbs geothermal heat by heat-exchanger from the pressurized water within chamber 2 of the primary cycle. With thereby acquired caloric energy from the hot water, the carbon dioxide warms up from point E to point F. From the serpentine-shape pipe 6, the gaseous carbon dioxide flows upwardly through the serpentine pipes to the laterally or horizontally extending pipes 8 and into the upwardly extending conduit 9 to the turbine 10 where the temperature during the process of passage is lowered from the point F to point G, by giving up of caloric energy from the carbon dioxide as such energy is converted into mechanical energy and into the electrical energy by the help of the mechanically driven electrical generator 13.

From the turbine 10, the carbon dioxide effluent flows from the turbine into the heat-exchanger 12 where it is cooled from the point G to point H, by transfer of its heat in a superheating of the carbon dioxide entering the heat-exchanger from the inlet pipe 22 coming from the heat-recuperator 21. The thereby-cooled effluent leading from the turbine 10 to the heat exchanger 12, passes through the conduit 14 to the cryogenic condenser 15 where the remaining heat is extracted by virtue of the condenser fluid coolant circulated isolated heat exchanger relationship therewith, preferably in counter flow relationship. As illustrated in FIG. 5, preferably the coolant enters in the bottom of the cryogenic condenser and passes upwardly in the direction of natural flow of heated gas, whereby the super-critical carbon dioxide becomes liquefied by condensation thereof within the condenser by lowering of the temperature from point H to point A at which point the liquid leaves the condenser in pipe 16.

This sub-cooling temperature depends upon the required pressure $P_2$ and the nature or physical properties of working fluid from secondary cycle. Temperature of working fluid from the sub-cooling and transfer cycle should have such value as to insure the sub-cooling temperature necessary for the working fluid from the secondary cycle discussed above.

In FIGS. 7, 8 and 9 there are shown a variation on a geothermal energy-capturing well in which the source of energy, i.e., the hard and hot rock, is the same. The well is excavated by typically conventional procedure in the sedimentary rocks or by procedures in accord with the patent application directed to an excavating of hard rock. In the sedimentary zone, well walls are reinforced and supported by appropriate casing 37. However, the hard and hot rock is not supported because such support is unnecessary in this type of rock. The hard and hot rock is a monolithic block having sufficient high density as to avoid collapse of the well walls. The excavating depth to which a well is carried is to such point as temperature allows, i.e., within the higher temperatures in which it is possible to perform excavation suitable.

After the well is excavated, there is introduced thereinto a concrete tube 43 and 40, extending along lengths of conduits 37, 38 and 41, as is shown in FIG. 7. A concrete tube extends downwardly to the bottom of the well to point 41' at about a mid-distance down, or at such point as the temperature becomes significently high in so far as geothermal energy is concerned. The channel 38 has the upper outer channel circumscribing the inner channel 43, and becomes the inner channel 40 while at the same location the upper channel 43 has become the inner channel after having previously been the lower outer channel 41. This relationship is, as noted above, shown in the embodiment of FIG. 7.

The changing of fluid flow from inner-chamber relationship, or vice-verse, permits a capture of the caloric heat energy with the geothermal well, allowing thereby the downwardly flowing cool carbon dioxide gas to reverse direction upwardly to be in direct contact with the hard and hot basalt rock at the points of high geothermal temperature and thereafter being channeled in the central channel 43 during its travel through upwardly located portion of cooler rock and sedimentary rock. The well functions as follows. Through the conduit 11', the fluid is caused to flow from the heat exchanger 12 FIG. 1 to which this would be connected as an alternate embodiment to enter the casing 37 of the well through connection 36'. Casing 37 channels the fluid in the channel 38 from which the fluid passes through the inner connecting passage 39 into the central tube 40, downwardly into the lower well space 41' from which fluid passes upwardly through interconnecting conduit 42 past barrier 44 into channel 43 upwardly to conduit 9' to the turbine 10 of FIG. 1 embodiment. When the carbon dioxide (or other appropriate fluid) goes into the well 41 and captures the caloric energy from the hot and hard basalt rock, the temperature continues to rise until the fluid reaches the connection 42 at which location the gaseous carbon dioxide passes upwardly to the conduit 9'.

The sub-cooling and transfer cycle is inclusive of equipment and apparatus for condensation sub-cooling and heat-recovery system as follows. The sub-cooling and transfer cycle includes the air at preferably super-critical temperature and pressure, the cryogenic condenser 15, the recuperators 19 and 21, and the turbo-compressor 24 driven by motor 23, as well as the super-critical turbine 27 and the conduits 28, 25, 26, 29 and 30.

The cryogenic condenser 15 if of a surface heat exchanger type, namely one in which the working fluid from the secondary cycle is isolated from the working fluid of the sub-cooling and transfer cycle. The cryogenic condenser also is equipped with a receiver for receiving and containing the carbon dioxide in liquefied state. The heat-recuperators 19 and 21 are also of the surface heat exchanger type. The sub-cooling and transfer cycle utilizes air at preferably super-critical parameters. The values of parameters depends upon the nature of the coolant employed. The parameters of the working fluid of this cycle are determined by the necessary temperature for condensation and sub-cooling of the working fluid of the secondary cycle, and determined also by economic considerations of cost.

As a working fluid for the sub-cooling and transfer cycle there may also alternately be employed one or more of nitrogen, hyrogen, or the like. Any one of these will function satisfactorily at the condensation and sub-cooling temperature of the working fluid of the secondary cycle and would satisfy economic consideration.

The turbor-compressor 24 is driven by the electrical energy 23 for the starting of the sub-cooling and transfer cycle as well as for compensating for other mechanical losses of energy incidental to the sub-cooling and transfer cycle. Energy for the driving of turbo-compressor 24 is insured by the turbine 27 which drives the turbo-compressor. The air gas channeled to the turbine 27 contains a large quantity of heat originally gained from the turbo-compressor 24, as heat generated by turbo-compressor 24 after which the fluid is passed through the recuperator 21, this heat from the air effluent of line 26 flowing to turbine 27 being sufficient to supplement or totally drive the turbo-compressor 24 prior to the redirecting of the turbine 27 effluent through line 28 to the cryogenic condenser 15 for a repeat of the former cycle. The turbo-compressor 24 is of the type such that the large gas flow volume can be compressed thereby. The conduits 25, 26, 28, 29 and 30 are built in accordance with conventional engineering with proper design for adequate working fluid circulation, for the sub-cooling and transfer cycle within the required parameters temperature and pressure. The turbine 27 is preferably super-critical pressure type:

The secondary cycle includes typically conduits filled with carbon dioxide as a preferred working fluid of the cycle. Pump 17 in series with the conduits 16, 18, 20 and 22 is of a conventional common type; the conduits are filled by conventional or desired techniques in such a way as to insure that the carbon dioxide circulation is maintained for the secondary cycle. The sub-cooling and transfer cycle operation is made in accordance with the diagrammatic illustration of FIG. 5, in which the turbo-compressor 24 (with mechanical energy received from the turbine 27 and electrical engine 23) compresses and heats working fluid air from point $a$ to point $b$. From the point $b$ to point $c$, the air is cooled within the recuperator 21 by the working fluid of the secondary cycle being preheated as it is received from the conduit 20. At the point $c$, air from the cycle enter into the turbine 27 where it is cooled to point $d$ unitl the turbine 27 converts the heat differential between point $c$ and $d$ into mechanical energy for driving the turbo-compressor 24. The air further leaves as turbine effluent from the turbine 27 at point $d$ and enters into the cryogenic condenser 15 where the temperature is raised from point $d$ to point $e$ by capture of caloric energy (the heat of condensation of the condensing super-critical carbon dioxide) from super-critical carbon dioxide fluid being directed to the condenser as a part of the secondary cycle through its respective conduit 14. The caloric energy absorbed in raising the temperature from point $d$ to point $e$ of the working cycle fluid is the heat of condensation for the secondary cycle of super-critical carbon dioxide. After the working fluid has increased in temperature to the point $e$ as it exits from the condenser 15, the working fluid thereafter enters into recuperator 19 at which point it gives up energy in the returning of heat to the super-critical carbon dioxide liquid of the secondary cycle. Super-critical gas at the croygenic condenser beginning of the cycle loses its heat from point H to downwardly point A, which equals the heat gained from $d$ to $e$. A this point the sub-cooling and transfer cycle is repeated.

The above-described geothermal embodiment allows theoretically the realization of condensation and sub-cooling of working fluid from the secondary cycle without any substantial degree or significant degree of losses in the heat elimination by the secondary cycle work fluid during the process of condensation and sub-cooling of the secondary fluid, mainly of the super-critical carbon-dioxide being condensed within the cryogenic condenser 15, with the help of the recuperator 19 and 21 which returns the heat of condensation to the super-critical carbon dioxide system after the compression by the pump 17. Such a geothermal power plant may use a heat exchanger medium in the secondary cycle such as carbon dioxide, or air, or nitrogen or the like, which it should be noted are low cost, i.e., of desirable economics. A power plant as described above has a additional advantage of not being complicated by being located underground and is devoid of rotation of mechanical mechanisms underground or other technical complicated problems which characterized prior systems. The geothermal power plant of this invention is the ideal geothermal power plant of this type or all of these excepted for the present invention above. The present inventive power plant as above-considered by the present inventor allows a complete automation without the necessity of local supervising during its operation. It should be noted that automation of a conventional and known type may be employed, this being conventional technology hereby incorporated by reference, and is not of the complexity as to require an illustration as the part of the present invention. Such automation as used conventionally in existing plants and the adaptations thereof apply to the present invention and is a matter of mere ordinary mechanical skills. Similarly, the conventional electrical installation and auxiliary equipment of the power plant is not shown because such is conventional and is well known in the art and is incorporated by reference as such part of the present system, being significant conventional and a part of prior art as to eliminate any need or necessity for the illustration as such for the present invention.

The present invention achieves a reduction in heat losses to the environment by the insulation of the interior walls of the tunnel tube, the interior walls of the wells 3, the exterior of the closure member 35 of the shaft of well 1, the exterior of the conduits such as 9, 11, 14, 16, 18, 20, 22, 25, 26, 28, 29 and 30, exterior of the turbines 10 and 27 and of the heat exchanger 12 and of the feed pump 17, the condenser 15, and the preheater 19 and 21. Alternately, other known, conventional or desired insulations may be employed. The insulation material may be chosen from typically existing known seals, corresponding working condition of equipment above shown as with the convention and the art.

In this present invention 3 and 4 embodiment, there is shown a heat caloric energy-capturing insulation embodiment for obtained caloric energy from the hot and hard basalt rock, which embodiment is basically similar to that of FIGS. 1 and 2, except being devoid of the primary cycle. In this embodiment, the carbon dioxide from a distribution of conduit 7' — corresponding to the lateral conduit 7 of the FIGS. 1 and 2 embodiments — is directed by multiple down-flow conduit channels 2"a into the intermediate gas-conducting chamber 2" through the open side 2"b thereof into the down-pipes or conducts 5" to exit at the bottom openings 5"a thereof in the chamber 4' adjacent or juxtaposition to the chamber bottom 4'a. In the chamber 4', the carbon dioxide is finally superheated and as it is superheated the hotter carbon dioxide goes upwardly to the conduit 3' entering that conduit by the inlet 3'a thereof and extending through the 3'b directly into the up-pipe which corresponds to the embodiment of FIGS. 1 and 2. During the passing of the carbon dioxide super-critical fluid laterally through the pipes 7' and downwardly through the pipes 2"a and through the space 2" and downwardly through the conduits 5", the super-critical dioxide is superheated by geothermal caloric energy derived from the adjacent basalt rock walls, as heat further gained while gases within are chamber 4'. In this particular embodiment, it is desirable to have a higher amount of water pressure bearing down on the underground insulation as in the shaft or well 1 of the FIG. 1 and 2 insulation, and accordingly the tunnel 2" of this insulation include a static liquid such as water or other suitable insulating liquid medium as high molecular weight or organic fluids within the chamber 2' or producing additional pressure from above to withstand the higher expansion of gases and possible resulting higher pressures therefrom within the chambers 2" and 4'. In the event that the press of the upper side of the member 35 is illustrated in FIGS. 1 and 2 is insignificant for equating or equalizing the pressure of the FIGS. 3 and 4 embodiment of the underside thereof, the water or the heat exchanger medium within the well 1 for the present embodiment of FIGS. 3 and 4 should become pressurized water to the extent of the needed additional pressure before condensation at the greater pressure below.

The FIGS. 3 and 4 embodiment is utilizable only in the situation where the hot and hard rock provides a sufficently good seal as to prevent fluid losses and/or when the temperature of the hot and hard rock is sufficently higher than the critical temperature of the water.

In the embodiment of the FIGS. 3 and 4, the separating member which is identified in FIGS. 1 and 2 as member 35 with its valves 31 and 33, being the same in the embodiment of FIGS. 3 and 4, will be preferably located at the parameteer of the well 3, the wells 5 and the like, into the tunnel 2" of this embodiment. As previously noted, the embodiment of the FIGS. 3 and 4 also preferably uses carbon dioxide and at supercritical pressure and temperature throughout its cycle.

It is within the scope and contemplation of the present invention to make such variations and modifications as would be apparent to a person with ordinary skill in this particular art, as well as to combine features of parent applications with those of the present invention as might be desirable or obvious to an engineer. Accordingly, the present invention includes reasonable variations, modifications and substitutions of equivalents within ordinary skills.

I claim:

1. A geothermal super-critical cycle power plant comprising in combination: a super-critical closed-system heat-transfer and heat utilization means including a high-pressure turbine, a high-pressure heat exchanger, a high pressure condenser means, a high-pressure pump, suitable for super-critical pressure, and including flowable therethrough and present therein in flow series a carbon dioxide heat transfer medium, and in series therewith a down and up-flow well having down-flow inlet and up-flow outlet conduits extending therethrough, a subterranean space in communication with the down and up-flow well defined within subterranean rock and and including within the flow series within the subterranean space a plurality of converging conduits in parallel with one-another channeling flow commonly from said down-flow inlet conduit into the space in flow series from the pump and heat exchanger; and chamber-defining means defining within said space at least an upper chamber, a lower chamber, a preheater chamber substantially partitioning between and communicating with each of the upper and lower chambers such that the upper and lower chambers are spaced a predetermined distance apart from one-another sufficient to provide a predetermined high degree of substantial insulation and flow space between the upper and lower chamber-defining means further including a plurality of chamber input conduit structures connecting the upper and the partitioning preheater chambers to the lower chamber, the input conduit structures extending into a lower portion of the lower chamber, the plurality of chamber input conduit structures being substantially vertically disposed and in juxtaposition to subterranean upright walls defining said lower chamber, and the chamber-defining means further including at least one lower-chamber outlet conduit interconnecting in flow series the upper chamber in flow series with the lower chamber for flow from the lower chamber of lower chamber heat exchange medium, and the lower-chamber outlet conduit having a flow passage cross-section and resulting flow capacity substantially greater than that of individual ones of the plurality of chamber input conduit structures.

2. A geothermal super-critical cycle power plant of claim 1, in which said lower-chamber outlet conduit is spaced substantially centrally between spaced-apart ones of the plurality of chamber input conduit structures, said at least one lower-chamber outlet conduit being of predetermined length substantially shorter than the input conduit structures, the lower chamber outlet conduits extending from an upper part of the lower chamber to the upper chamber, and said subterranean rock being basalt rock.

3. A geothermal super-critical cycle power plant of claim 2, in which said super-critical closed-system heat-transfer and heat utilization means further includes said plurality of parallel converging conduits further converging at opposite ends thereof into a common upper chamber outlet conduit extending operatively upwardly to said turbine, such that there is provided for flow of said carbon dioxide through said upper chamber without contact with the upper-chamber defining walls of said basalt rock as the carbon dioxide flows through the plurality of parallel converging conduits, and there being flow communication through the upper chamber between the upper chamber inlet from the lower chamber outlet conduit to the input conduit structures from two of said upper chambers through the preheater chambers into the lower chamber, such that heat exchange medium flows cyclically between upper and lower chambers in heat exchange but isolated relationship with the carbon dioxide within the parallel converging conduits of the upper chamber, the carbon dioxide being flowable through the upper chamber's common inlet conduit through said plurality of converging conduits upwardly through said common upper chamber outlet conduit.

4. A geothermal super-critical cycle power plant of claim 3, including pressure means for providing a predetermined degree of high pressure on heat exchange medium flowable cyclically between said upper, preheater and lower chambers, and including well structure defining a well passage extending upwardly from said upper chamber and defining a substantially horizontal wall structure having flow-ports therethrough and substantially segregating said well passage from space of said upper chamber, and including an insulation liquid within said well passage of said down and up-flow well, said insulation liquid substantially surrounding down-flow inlet and up-flow outlet conduits for carrying the carbon dioxide downwardly and upwardly respectively in the super-critical closed-system heat-transfer and heat utilization means.

5. A geothermal super-critical cycle power plant of claim 4, and in which as a part of said super-critical closed-system heat-transfer and heat utilization means there is included in flow series behind said turbine in flow series, a heat exchanger having a carbon dioxide-effluent-carrying conduit extending from an outlet of said turbine and an inlet to said condenser means, with the carbon dioxide-effluent-carrying conduit passing in isolated heat-exchange relationship with a super-heating carbon dioxide-carrying conduit structure.

6. A geothermal super-critical cycle power plant of claim 4, including in operative cyclic flow series a cryogenic condenser means having coolant fluid for condensing and subcooling effluent from said turbine; a first heat recuperator means located in flow-series behind said cryogenic condenser means and operatively connected for recovery of heat from said coolant fluid by said carbon dioxide in a condensed state to become reheated carbon dioxide; a turbo-compressor means located in coolant flow series behind said first heat recuperator means, operatively connected for compressing and thereby heating by energy-of-compression said coolant fluid; a second heat recuperator means located in flow series behind said turbo-compressor means and operatively connected for heat-recovery by said reheated carbon dioxide flowable from said first recuperator means, to result in cooled coolant fluid; a heat-withdrawal means for further cooling and reducing pressure of cooled coolant fluid and the heat-withdrawal means being located in coolant flow series behind said second heat recuperator means and being connected to return the further cooled and reduced-pressure coolant fluid to said cryogenic condenser means.

7. A geothermal super-critical cycle power plant of claim 1, including in operative cyclic flow series a cryogenic condenser means having coolant fluid for condensing and subcooling effluent from said turbine; a first heat recuperator means located in flow-series behind said cryogenic condenser means and operatively connected for recovery of heat from said coolant fluid by said carbon dioxide in a condensed state to become reheated carbon dioxide; a turbo-compressor means located in coolant flow series behind said first heat recuperator means, operatively connected for compressing and thereby heating by energy-of-compression said coolant fluid; a second heat recuperator located in flow series behind said turbo-compressor means and operatively connected for heat-recovery by said reheated carbon dioxide flowable from said first recuperator means, to result in cooled coolant fluid; a heat-withdrawal means for further cooling and reducing pressure of cooled coolant fluid and the heat-withdrawal means being located in coolant flow series behind said second heat recuperator means and being connected to return the further cooled and reduced-pressure coolant fluid to said cryogenic condenser means.

8. A geothermal super-critical cycle power plant of claim 1, and in which as a part of said super-critical closed-system heat-transfer and heat utilization means there is included in flow series behind said turbine in flow series, a heat exchanger having a carbon dioxide-effluent-carrying conduit extending from an outlet of said turbine and an inlet to said condenser means, with the carbon dioxide-effluent-carrying conduit passing in isolated heat-exchange relationship with a super-heating carbon dioxide-carying conduit structure.

9. A geothermal super-critical cycle power plant of claim 2, in which said plurality of converging conduits emptying into said subterranean space downwardly through said preheater and lower chambers, and in which said lower-chamber outlet conduit extending through said upper chamber and connected with the up-flow outlet conduit such that there is provided for isolated serial flow from the lower chamber to and into said up-flow outlet conduit.

* * * * *